Patented July 27, 1954

2,684,965

UNITED STATES PATENT OFFICE 2,684,965

AMINOALKYLPIPERIDINES

Arthur W. Weston, Armiger H. Sommers, and Karl M. Beck, Waukegan, Ill., assignors to Abbott Laboratories, North Chicago, Ill., a corporation of Illinois No Drawing. Application August 10, 1950,
Serial No. 178,758

8 Claims. (Cl. 260—294)

This invention relates to new chemical compounds and processes for preparing them. Many of these substances have physiological action, and some of them are useful as intermediates in synthesis of other compounds. In particular many of the compounds possess diuretic and/or local anesthetic action in animals. Compounds having such properties are useful in pharmacological tests and demonstrations. The compounds which are diuretics are of interest, since they are free from mercury. They appear to have advantages over such compounds as urea, formoquanamine, or theophylline. It is not represented that they are free from all undesirable side reactions in each and every individual animal. This can only be determined after many years of investigation. The compounds do, however, have unexpected properties which render them useful in many cases.

The compounds of this invention may be represented by the formula:

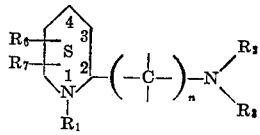

where $R_1$ is an alkyl, aralkyl, acyl or carbalkoxy (aliphatic or aromatic). $R_2$ and $R_3$ may be alkyl groups or $R_2$ and $R_3$ together may be a single alkylene group joined at its ends to the nitrogen atom, to form the cyclic piperidyl group, or $R_3$ and $R_2$ may form the heterocyclic morpholino group. $R_6$ and $R_7$ are non-toxic substituents and if on adjacent carbon atoms they may be attached at the ends to form a second ring. The letter S within the hexagon means that the ring is saturated. The letter $n$ represents a small whole number. If $R_1$, $R_6$ and $R_7$ are hydrogen then

must form a cyclic group. Reasonable limits are to be placed on the size of the various groups mentioned above. It is obvious to anyone skilled in the art that groups containing twenty or thirty carbon atoms will probably render a molecule insoluble, and, therefore, of little or no value. The terms alkyl and alkylene have an upper limit of about eight carbon atoms. Introduction of such atoms as arsenic, selenium, tellurium, etc., may render a compound too toxic to be useful. When $R_1$ is an acyl such as a lower alkanoyl or a substituted benzoyl the compounds have local anesthetic properties, whereas the other compounds have diuretic activity.

As the sizes of the different groups are changed, there is, of course, a change in the degree or intensity of one or more of the properties of the compounds. The preferred compounds are represented by the formula:

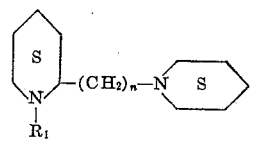

where $R_1$=hydrogen, alkyl, aralkyl, acyl, or carbalkoxy, and $n$ may be any number from 1 through 5.

In the preparation of the compounds of this invention a satisfactory starting material is a 2-[ω-dialkylamino or cyclic alkyleneaminoalkyl]-pyridine of the formula

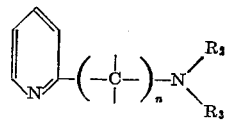

This compound is reacted with hydrogen to reduce the pyridine ring to a piperidine ring. The platinum catalyst of Adams is satisfactory for use in the reduction. The resulting piperidyl compound is then reacted with a compound of the formula $R_1$—X, where X is chlorine, bromine or iodine to produce a compound of the formula

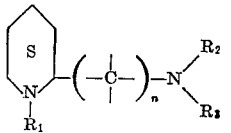

The reaction may be carried out in a suitable solvent and in the presence of an acid binding agent to remove the HX formed in the reaction.

An alkyl or aralkyl group such as $R_1$ may be produced by reduction of the corresponding acyl group as in Examples III and VI, or by reductive alkylation as in Examples XVIII and II.

In place of $R_1$—X there may be used a compound of the formula

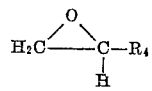

if it is desired to add a group of the formula

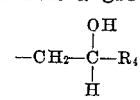

where $R_4$ is H or alkyl.

Since these compounds contain two basic nitrogen atoms they can produce either mono or di acid salts with the common acids either organic or inorganic. The hydrochlorides, for example, are a satisfactory form.

The invention may be illustrated, but is not necessarily limited, by the following examples.

EXAMPLE I

2-[β-(1-piperidyl)-ethyl]-piperidine

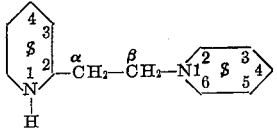

A mixture of 134 g. (0.7 mol) of 2-[β-(1-piperidyl)-ethyl]-pyridine [prepared by the method of Doering and Weil, J. Am. Chem. Soc. 69, (1947)], 3 g. of Adams platinum oxide catalyst and 750 cc. of acetic acid is shaken overnight under a pressure of 500 lbs./sq. in. of hydrogen. The mixture is filtered and the solvent is removed on the steam bath under reduced pressure. The syrupy residue is cooled in ice and treated with a solution of 150 g. of sodium hydroxide in 375 cc. of water. The basic mixture is shaken twice with ether and the combined ethereal extracts are dried over anhydrous potassium carbonate. Distillation of the residue obtained by filtering and stripping the extract gives 105.5 g. (77%) of product, a colorless liquid B. P. 107-8°/1.2 mm., $n_D^{25}=1.4900$. It forms a dihydrochloride salt when treated in ether solution with gaseous hydrogen chloride. This salt melts at 305-7° after recrystallization from an ethanol and ether mixture.

EXAMPLE II 1-methyl-2-[β-(1-piperidyl)-ethyl]-piperidine

A mixture of 24 g. of 2-[β-(1-piperidyl)-ethyl]-piperidine, 16 g. of anhydrous formic acid and 11 g. of formalin is heated on a steam bath for 4 hours. After adding 35 cc. of 6 hydrochloric acid, the mixture is concentrated in vacuo. The addition of 35 g. of 50% sodium hydroxide causes the product to separate as an oil. This oil is collected, and the aqueous solution washed with ether. The combined oil and ether extracts is dried over solid potassium hydroxide. After removing the ether, the product is purified by distillation. It is a colorless liquid which boils at 83-84°/0.9 mm., $n_D^{25}=1.4876$. The yield is 24 g. (93%).

1-methyl-2-[β-(1-piperidyl)-ethyl]-piperidine forms a dihydrochloride in ether which recrystallizes from ethanol-ether as a white solid melting with decomposition at 286-287°.

EXAMPLE III 1-ethyl-2-[β-(1-piperidyl)-ethyl]-piperidine

A solution of 8 g. of 1-acetyl-2-[β-(1-piperidyl)-ethyl]-piperidine in 100 cc. of dry ether is added to a mixture of 5.3 g. of lithium aluminum hydride in 50 cc. of dry ether, which is being stirred, at a rate which maintains gentle reflux of the ether. After the addition is complete, the mixture is stirred and heated at reflux for 22 hours. The excess lithium aluminum hydride is destroyed by the cautious addition of 15 cc. of water, and the mixture is filtered. The filtrate is dried over potassium hydroxide. After removing the ether, the product is purified by distillation. It is collected as a colorless liquid boiling at 87-88°/0.5 mm., $n_D^{25}=1.4879$. The yield is 6.5 g. (80%).

The product forms a dihydrochloride-hemihydrate in ether which melts at 264-265° with decomposition.

EXAMPLE IV 1-(β-hydroxyethyl)-2-[β-(1-piperidyl)-ethyl]-piperidine

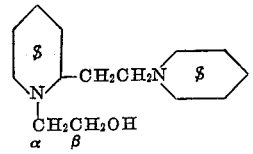

A solution of 20 g. of 2-[β-(1-piperidyl)-ethyl]-piperidine in 20 cc. of 10% sodium hydroxide is heated at 45° and stirred during the addition of 4 g. of ethylene chlorohydrin and for 2 hours after the addition is complete. Stirring is continued at room temperature for 20 hours more. The addition of 6 g. of sodium hydroxide causes an oil to separate. This oil is collected and combined with an ether extract of the aqueous portion. The ether is removed, and fractional distillation of the remaining liquid through a column packed with glass helices gives 12 g. of unreacted 2-[β-(1-piperidyl)-ethyl]-piperidine and 6 g. of product. The product is an almost colorless, viscous liquid which boils at 116-117°/0.4 mm., $n_D^{25}=1.5046$. The yield is 70% of theoretical based on unrecovered starting material.

EXAMPLE V 1-(β-hydroxypropyl)-2-[β-(1-piperidyl)-ethyl]-piperidine

A solution of 5 g. of 2-[β-(1-piperidyl)-ethyl]-piperidine in 25 cc. of methanol is heated at 45-50° and stirred while a solution of 1.5 g. of 1,2-propylene oxide in 10 cc. of methanol is added and for 4 hours after the addition is completed. After standing overnight, the solution is concentrated and the residue distilled. The product is collected as a colorless, viscous liquid boiling at 105°/0.3 mm., $n_D^{25}=1.4934$. The yield is 3 g. (46%).

EXAMPLE VI 1-benzyl-2-[β-(1-piperidyl)-ethyl]-piperidine

A mixture of 7.6 g. (0.2 mol) of powdered lithium aluminum hydride and 400 cc. of dry ether is stirred under a nitrogen atmosphere while a solution of 15 g. (0.05 mol) of 1-benzoyl-2-[β-(1-piperidyl)-ethyl]-piperidine is added dropwise during three and one-half hours. The mixture is stirred overnight, and water is then cautiously added until the color becomes milk-white and there is no longer any refluxing. The mixture is filtered and the filtrate is dried with anhydrous potassium carbonate and distilled. There is obtained 11.9 g. (84%) of product, a liquid, B. P. 172-4°/1 mm., $n_D^{25}=1.5300$. The monohydrochloride salt of this compound may be prepared by treating an isopropanol solution of the free base with one equivalent of dry hydrogen chloride gas per mol of base, and precipitating the salt by the addition of dry ether. This salt turns red at 155° and melts slowly from 175-190° to a dark red oil.

The dihydrochloride salt, prepared in a similar manner using two equivalents of hydrogen chloride melts at 241-2°. The sulfate sesquihydrate salt, prepared in ethanol and ether using equimolar amounts of the base and sulfuric acid melts slowly when heated above 75°.

EXAMPLE VII

*1-carbethoxy-2-[β-(1-piperidyl)-ethyl]-piperdine*

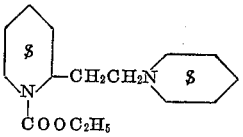

A mixture of 20 g. of 2-[β-(1-piperidyl)-ethyl-piperidine, 10 g. of sodium bicarbonate, and 50 cc. of acetone is stirred while a solution of 13 g. of ethyl chloroformate in 50 cc. of acetone is added dropwise. Stirring is continued for 3 hours more, and the mixture is filtered. Concentration of the filtrate causes more inorganic material to precipitate, and it is removed and the remaining liquid is distilled. The product is collected as a colorless liquid which boils at 116–117°/0.3 mm., $n_D^{25}$=1.4867. The yield is 19 g. (68%).

EXAMPLE VIII

*1-formyl-2-[β-(1-piperidyl)-ethyl]-piperidine*

A mixture of 10.5 g. of 2-[β-(1-piperidyl)-ethyl]-piperidine, 20 g. of ethyl formate, and 75 cc. of absolute ethanol is heated at reflux for 24 hours. The solvent and excess ethyl formate are removed, and the product is purified by distillation. A quantitative yield of product is obtained. It is a colorless, viscous liquid boiling at 131–132°/0.8 mm., $n_D^{25}$=1.5024.

EXAMPLE IX

*1-acetyl-2-[β-(1-piperidyl)-ethyl]-piperidine*

A mixture of 10.5 g. of 2-[β-(1-piperidyl)-ethyl]-piperidine and 32 g. of acetic anhydride is heated at reflux for 15 minutes. After removing most of the excess acetic anhydride, an equal volume of water is added to the reaction mixture. The aqueous solution is made alkaline with 8 g. of 50% sodium hydroxide, and the brown oil which forms is collected and combined with an ether extract of the aqueous portion. The ether solution is dried over solid potassium hydroxide, and the product is distilled to purify it. The product is a colorless liquid which boils at 124–125°/0.4 mm., $n_D^{25}$=1.5018. The yield is 11 g. (86%).

EXAMPLE X

*1-n-butyryl-2-[β-(1-piperidyl)-ethyl]-piperidine*

A mixture of 10 g. (0.051 mol) of 2-[β-(1-piperidyl)-ethyl]-piperidine and 15 cc. of 40% sodium hydroxide solution is cooled and shaken while 6.4 g. (0.06 mol) of n-butyryl chloride is slowly added. After the mixture has stood overnight it is diluted with water and shaken with ether. The ethereal extract is dried with anhydrous magnesium sulfate, filtered, and distilled. This procedure gives 1.8 g. of recovered diamino compound and 7.2 g. (52%) of product, an oil, B. P. 144–6°/0.3 mm., $n_D^{25}$=1.4968.

The free base is dissolved in ether and treated with gaseous hydrogen chloride to prepare the hydrochloride salt which may be recrystallized from a mixture of isopropanol and ether. It melts at 169–170°.

EXAMPLE XI

*1-benzoyl-2-[β-(1-piperidyl)-ethyl]-piperidine*

A mixture of 14.4 g. (0.074 mol) of 2-[β-(1-piperidyl)-ethyl]-piperidine and 150 cc. of 20% sodium hydroxide solution is shaken and cooled while 25 cc. of benzoyl chloride is added in small portions. The mixture is allowed to stand overnight, and is then shaken with ether. Distillation of the filtered ethereal extract gives 15.2 g. (68%) of product, an oil distilling at 204–7°/1 mm., $n_D^{25}$=1.5443. The hydrochloride salt is a crystalline solid, M. P. 214–5°.

EXAMPLE XII

*1-p-chlorobenzoyl-2-[β-(1-piperidyl)-ethyl]-piperidine*

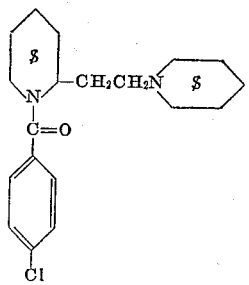

To a cooled mixture of 15 g. (0.077 mol) of 2-[β-(1-piperidyl)-ethyl]-piperidine and 25 cc. of 50% soduim hydroxide solution there is added slowly with shaking 17.5 g. (0.1 mol) of p-chlorobenzoyl chloride. After two days the mixture is treated with 25 cc. of 50% sodium hydroxide and 150 cc. of water, and is shaken with ether. The ethereal extract is dried with anhydrous magnesium sulfate and stripped to remove the solvent. Distillation of the residue gives 16.5 g. (65%) of product, a viscous oil, B. P. 203–4°/0.5 mm. It forms a crystalline hydrochloride hemihydrate salt which melts at 209–210° after recrystallization from a mixture of n-propanol and ethyl ether.

EXAMPLE XIII

*1-p-methoxybenzoyl-2-[β-(1-piperidy)-ethyl]-piperidine*

A mixture of 15 g. (0.077 mol) of 2-[β-(1-piperidyl)-ethyl]-piperidine and 25 cc. of 50% sodium hydroxide is shaken and cooled while 17.1 g. (0.1 mol) of p-methoxybenzoyl chloride is added in small portions. After two days the mixture is treated with 100 cc. of 10% sodium hydroxide solution and is shaken with ether. The ethereal extract is dried over anhydrous magnesium sulfate and stripped. Distillation of the residue gives 17.5 g. of product, a viscous oil, B. P. 203–6°/0.3 mm. It forms a crystalline hydrochloride salt, M. P. 227–8°.

EXAMPLE XIV

*1-p-nitrobenzoyl-2-[β-(1-piperidyl)-ethyl]-piperidine*

A solution of 25 g. (0.135 mol) of p-nitrobenzoyl chloride in 100 cc. of benzene is slowly added with shaking to a cooled mixture of 25 g. (0.128 mol) of 2-[β-(1-piperidyl)-ethyl]-piperidine and 32 cc. of 50% sodium hydroxide solution. After two days the mixture is diluted with an equal volume of water and is shaken with benzene. The benzene extract is boiled with 5 g. of Norite, filtered, and evaporated. The residue is heated to a bath temperature of 185° at a pressure of 0.3 mm. and there remains 38 g. (86%) of product, a very viscous orange liquid. The free base is converted to the hydrochloride salt by treating an ethereal solution with gaseous hydrogen chloride. It forms a white crystalline solid which melts at 199–200° after recrystallization from a mixture of isopropanol and ether.

EXAMPLE XV

*1-p-aminobenzoyl-2-[β-(1-piperidyl)-ethyl]-piperidine*

An aqueous solution of 38.2 g. (0.1 mol) of 1 - p - nitrobenzoyl - 2 - [β - (1 - piperidyl) - ethyl]-piperidine hydrochloride is shaken with palladium on charcoal under hydrogen until 0.3 mol of hydrogen has been absorbed. By treatment of the filtered solution with sodium hydroxide there is obtained a yellow semi-solid organic layer which is extracted with ether. It distills at 238–242°/0.5 mm. and forms a clear, light yellow glass on cooling. The dihydrochloride salt is prepared with anhydrous hydrogen chloride in isopropanol. This salt melts and resolidifies at 180–190°. By evaporation of the original aqueous solution obtained on hydrogenation of the nitro compound there is obtained the monohydrochloride monohydrate salt, M. P. 224°.

EXAMPLE XVI

*1 - phenylacetyl - 2 - [β - (1 - piperidyl) - ethyl]-piperidine*

A mixture of 15 g. (0.077 mol) of 2-[β-(1-piperidyl)-ethyl]-piperidine and 24 cc. of 50% sodium hydroxide is cooled and shaken during the slow addition of 15.5 g. (0.1 mol) of phenylacetyl chloride. After two days the mixture is diluted with water and shaken with ether. Distillation of the dried ethereal extract gives 6.5 g. of recovered diamino compound and 7.5 g. (55%) of product, a liquid, B. P. 183–5°/0.25 mm., $n_D^{25}$=1.5393. The hydrochloride salt melts at 185–7°.

EXAMPLE XVII

*1-diphenylacetyl-2-[β-(1-piperidyl)-ethyl]-piperidine*

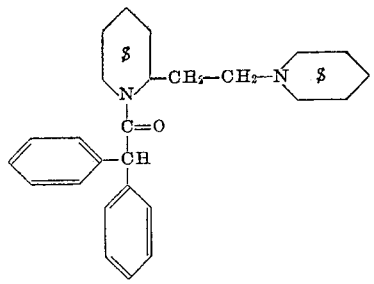

A mixture of 15 g. (0.077 mol) of 2-[β-(1-piperidyl)-ethyl]-piperidine and 25 cc. of 50% sodium hydroxide solution is cooled and shaken during the gradual addition of 23.1 g. (0.10 mol) of diphenylacetyl chloride. After two days the mixture is diluted with an equal volume of water and is shaken with ether. Distillation of the dried ethereal extract gives 3.5 g. of recovered diamino compound and leaves a residue of 14.4 g. (63%) of product, a light-yellow syrup which soon solidifies. After recrystallization from Skellysolve B the product melts at 100–100.5°. The hydrochloride salt melts at 206.5–207.5°.

EXAMPLE XVIII

*1-p-methoxybenzyl-2-[β-(1-piperidyl)-ethyl]-piperidine*

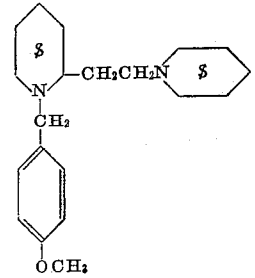

To a solution of 9.2 g. of 2-[β-(1-piperidyl)-ethyl]-piperidine in 40 cc. of 90% formic acid, there is added 7.5 g. of p-methoxybenzaldehyde. The solution is refluxed for 3 hours, then cooled, made acidic and ether extracted. The aqueous layer is made basic with 50% potassium hydroxide and ether extracted. The extracts are dried and the solvent removed under vacuum. The residual oil distills at 190°/0.60 mm.

EXAMPLE XIX

*1-benzoyl-2-(β-diethylaminoethyl)-piperidine*

A solution of 1.87 g. (0.0133 mol) of benzoyl chloride in 10 cc. of dry benzene is added to a solution of 2.45 g. (0.0133 mol) of 2-(β-diethylaminoethyl)-piperidine in 15 cc. of dry benzene. The mixture is refluxed for three hours, and the solvent is then removed under vacuum. The residual oil is treated with 25 cc. of water and 10 cc. of 10% sodium hydroxide solution. The organic layer which forms is extracted with ether, and the extract is dried over anhydrous potassium carbonate. After removal of the solvent the residue is distilled and 1.25 g. (34%) of product, B. P. 150–3°/0.3 mm. is obtained. It is an oil, $n_D^{25}$=1.5281.

EXAMPLE XX

*2 - [β - (1 - piperidyl) - ethyl] - 1,2,3,4 - tetrahydroquinoline*

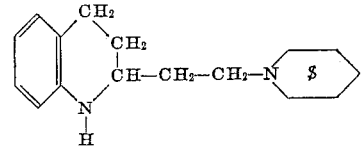

A solution of 29.8 g. (0.13 mol) of 2-[β-(1-piperidyl)-ethyl]-quinoline [Heou-Feo, Bull. soc. chim. France (5) 2, 96 (1935)] in glacial acetic acid is hydrogenated in the presence of Adams platinum oxide catalyst and the resulting mixture is filtered and stripped under vacuum. A solution of 50 g. of sodium hydroxide in 125 cc. of water is added to the residue, and the organic layer is extracted with ether. The extract is dried over anhydrous potassium carbonate, stripped, and distilled. The product is a light yellow oil, B. P. 143–7°/0.4 mm., $n_D^{20}$=1.5659. The monohydrochloride salt, recrystallized from n-propanol is a white crystalline solid, M. P. 243°.

EXAMPLE XXI

*1 - benzoyl - 2 - [β - (1 - piperidyl) - ethyl] - 1,2,3,4-tetrahydroquinoline*

A mixture of 6.1 g. (0.025 mol) of 2-[β-(1-piperidyl)-ethyl]-1,2,3,4-tetrahydroquinoline and 40 cc. of 25% sodium hydroxide solution is shaken while 15 g. (0.11 mol) of benzoyl chloride is added in portions. After 15 hours the mixture is heated on the steam cone with a mixture of 150 cc. each of water and benzene, and the benzene layer is separated. Distillation of this solution gives 4.66 g. of a yellow oil, B. P. 202–3°/0.1 mm. which solidified when treated with dry ether. After the solid has been washed with ether it is redistilled and 2.9 g. (33%) of product is obtained. It is recrystallized from Skellysolve B and forms a white crystalline solid, M. P. 102–3°. This may be converted to the crystalline hydrochloride salt, M. P. 235.5–236.5°.

EXAMPLE XXII

*1-methyl-2-(1-piperidylmethyl)-piperidine*

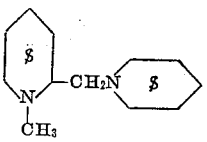

In the manner described (see prep. of homolog, Example II) 3.15 g. of 2-(1-piperidylmethyl)-piperidine is methylated with 2.4 g. of anhydrous formic acid and 1.5 g. of formalin. The product is a colorless liquid which boils at 94–95°/2.4 mm., $n_D^{25}=1.4846$. The yield is 2 g. (59%).

EXAMPLE XXIII

*1-benzoyl-2-(1-piperidylmethyl)-piperidine*

A mixture of 9.1 g. (0.05 mol) of 2-(1-piperidylmethyl)-piperidine and 40 cc. of 50% sodium hydroxide solution is cooled in ice and shaken while 30 g. of benzoyl chloride is added in small portions. After 16 hours the brown mixture is treated with 50 cc. of 10% sodium hydroxide and is shaken with warm benzene. When the benzene extract is distilled there is obtained 5.3 g. (37%) of viscous yellow oil, B. P. 160–70°/0.3 mm. This is converted to the hydrochloride salt by treatment of an ethereal solution with dry hydrogen chloride in ether. The precipitate is recrystallized from a mixture of n-propanol and ether, and forms fine white crystals, M. P. 255°.

EXAMPLE XXIV

*1-p-methoxybenzoyl-2-(1-piperidylmethyl)-piperidine*

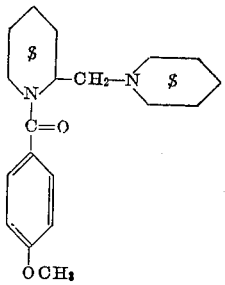

A mixture of 7.3 g. (0.04 mol) of 2-(1-piperidylmethyl)-piperidine and 25 cc. of 50% sodium hydroxide solution is cooled and shaken while 10.3 g. (0.06 mol) of p-methoxybenzoyl chloride is added in small portions. After 18 hours the brown mixture is treated with 50 cc. of 10% sodium hydroxide solution and is shaken with warm benzene. The benzene extract is distilled, and 4.6 g. of yellow oil, B. P. 184–194°/0.2 mm. is obtained. This is dissolved in hot Skellysolve B, and the crystalline solid which separates when the solution is cooled is removed by filtering. The filtrate is distilled and 2.1 g. of product, a very viscous yellow oil, B. P. 185–9°/0.3 mm. is obtained. It forms a white crystalline hydrochloride salt, M. P. 244°.

EXAMPLE XXV

*1-benzyl-2-(1-piperidylmethyl)-piperidine*

A solution of 2.84 g. (0.01 mol) of 1-benzoyl-2-(1-piperidylmethyl)-piperidine in 75 cc. of dry ether is added dropwise during 40 minutes to a stirred mixture of 1.52 g. (0.04 mol) of lithium aluminum hydride and 150 cc. of dry ether under a nitrogen atmosphere. After four hours the reaction mixture is treated with 4.5 cc. of water and filtered. The filtrate is dried with anhydrous potassium carbonate and distilled. There is obtained 1.63 g. (60%) of product, an oil boiling at 136–7°/0.3 mm.

EXAMPLE XXVI

*1-(α-picolinoyl)-piperidine*

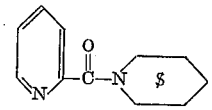

A benzene solution of α-picolinoyl chloride prepared by the method of Meyer and Graf [Ber. 61, 2204 (1928)] from 100 g. (0.814 mol) α-picolinic acid and 150 cc. of thionyl chloride is slowly added to a mixture of 85 g. (1 mol) of piperidine in 250 cc. of 10% sodium hydroxide solution with stirring and cooling in an ice bath. After 18 hours the layers are separated, and the aqueous layer is treated with 25 g. of sodium hydroxide and shaken with 100 cc. of benzene. The benzene layers are combined and distilled, and the fraction which boils at 131–5°/0.3 mm. is recrystallized from 750 cc. of Skellysolve B. This gives 48 g. (31%) of product, a white crystalline solid, M. P. 76–77.5°.

EXAMPLE XXVII

*2-(1-piperidylmethyl)-pyridine*

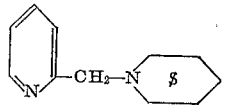

A mixture of 1500 cc. of dry ethyl ether and 38 g. (1 mol) of powdered lithium aluminum hydride is stirred in an atmosphere of nitrogen while a solution of 47 g. (0.25 mol) of 1-(α-picolinoyl)-piperidine in 650 cc. of dry ether is added during five hours. The mixture refluxes gently during the addition, and becomes a dirty green suspension. It is stirred for seventeen hours, and is then treated carefully with 110 cc. of water. The light suspension which forms is filtered, and the filtrate is dried with anhydrous potassium carbonate and distilled. It gives 24.1 g. (55%) of product, a colorless liquid, B. P. 122–4°/10 mm., $n_D^{25}=1.5170$. It forms a dihydrochloride salt, M. P. 200–215°.

EXAMPLE XXVIII

*2-(1-piperidylmethyl)-piperidine*

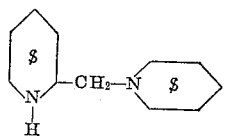

A solution of 23.7 g. (0.135 mol) of 2-(1-piperidylmethyl)-pyridine in acetic acid is hydrogenated over Adams platinum oxide catalyst. After the absorption of hydrogen is complete, the mixture is filtered to remove the catalyst and the solvent is evaporated under vacuum on the steam cone. To the residue there is added a solution of 50 g. of sodium hydroxide in 100 cc. of water. The organic layer which separates is extracted by ether, and the extract is dried with potassium carbonate and is distilled. There is obtained 17.5 g. of colorless liquid, B. P. 104–6°/5 mm.

EXAMPLE XXIX 1-(α-pipecolinoyl)-piperidine

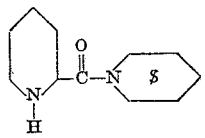

A solution of 10.5 g. (0.055 mole) of 1-(α-picolinoyl)-piperidine in 100 cc. of water containing 5 cc. of concentrated hydrochloric acid is hydrogenated under 30# pressure employing previously reduced platinum oxide (1.0 g.). After the reduction is complete, the mixture is filtered and concentrated under reduced pressure until the product partially crystallizes. Acetone is added to complete the precipitation. The product after crystallization from an obsolute alcohol-ether mixture melts at 254–5° with decomposition.

EXAMPLE XXX 1-p-ethoxybenzoyl-2-[β-(1-piperidyl)-ethyl]-piperidine

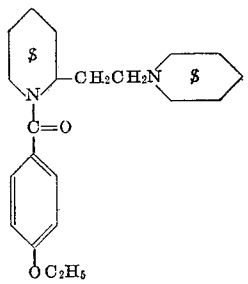

By employing the directions described under Example XIII, and employing 15 g. (0.077 mol) of 2-[β-(1-piperidyl)-ethyl]-piperidine 25 cc. of 50% sodium hydroxide and 18.5 g. (0.1 mol) of p-ethoxybenzoyl chloride, there is obtained the product represented by the above structure. It boils at 231–33°/2 mm. This base forms a crystalline hydrochloride salt which melts at 202–3°.

EXAMPLE XXXI

2-[β-(1-morpholino)-ethyl]-pyridine

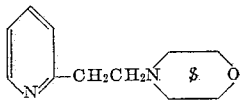

A mixture of 105 g. (1 mol) of 2-vinyl pyridine and 174 g. (2 mol) of morpholine is refluxed overnight. The excess morpholine is removed and the residual oil is distilled whereby the desired product boiling at 167–170°/18 mm. is obtained.

EXAMPLE XXXII

2-[β-(1-morpholino)-ethyl]-piperidine

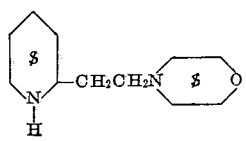

A solution of 1 mol of 2-[β-(1-morpholino)-ethyl]-pyridine in glacial acetic acid is reduced in the presence of Adams platinum oxide catalyst. The solvent is removed and the residue is basified with 20% sodium hydroxide solution. The resulting oil is extracted with ether and the combined extracts are dried, concentrated and the residue distilled. The product is a colorless liquid which boils at 89–90°/0.5 mm.

EXAMPLE XXXIII 1-benzoyl-2-[β-(1-morpholino)-ethyl]-piperidine

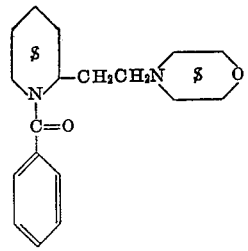

To a solution of 9.9 g. of 2-[β-(1-morpholino)-ethyl]-piperidine in 50 cc. of dry benzene there is added 7 g. of benzoyl chloride dissolved in 10 cc. of dry benzene. The mixture is refluxed 4 hours whereupon the hydrochloride of the desired product separates as a crystalline solid from the reaction mixture. This material is removed by filtration and crystallized from an alcohol-ether mixture. The pure hydrochloride salt melts at 202–203°.

EXAMPLE XXXIV 1-isopropyl-2-[β-(1-piperidyl)-ethyl]-piperidine

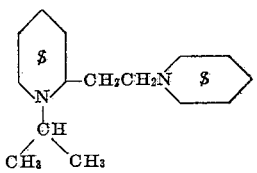

A mixture of 21 g. of 2-[β-(1-piperidyl)-ethyl]-piperidine and 7 g. of isopropyl bromide was heated on a steam bath for 7 hours. After distilling away the unreacted 2-[β-(1-piperidyl)-ethyl]-piperidine, the crude product was dissolved in ether and converted to a hydrochloride salt with ethereal hydrogen chloride. The dihydrochloride-hemihydrate of the product thus formed was purified by fractional recrystallization from an isopropyl alcohol-dry ether mixture. It melted at 248–249° (dec.).

The compounds may be given orally or parenterally and in form of solutions, capsules, tablets, powders or other appropriate preparations.

Others may readily adapt the invention for use under varying conditions of service, by employing one or more of the novel features disclosed, or equivalents thereof. As at present advised with respect to the apparent scope of our invention, we desire to claim the following subject matter.

We claim:
1. A compound of the formula:

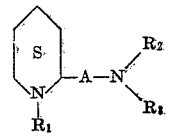

wherein $R_1$ is a member selected from the class consisting of hydrogen, lower alkyl, benzyl, lower alkoxy benzyl, lower alkanoyl, lower alkoxy benzoyl, nitrobenzoyl, aminobenzoyl, halobenzoyl, lower carbalkoxy, and lower alkanol;

is a group selected from the class consisting of di(lower alkyl) amino, piperidino, and morpholino groups; A is a lower alkylene group containing from one to five carbon atoms; and S indicates that the ring is saturated.

2. The compound 1-methyl-2-[β-(1-piperidyl)-ether]-piperidine.
3. The compound 1-benzyl-2-[β-(1-piperidyl)-ethyl]-piperidine.
4. The compound 1-phenylacetyl-2-[β-(1-piperidyl)-ethyl]-piperidine.
5. The compound 1-methyl-2-(1-piperidylmethyl)-piperidine.
6. The compound 1-formyl-2-[β-(1-piperidyl)-ethyl]-piperidone.
7. In the process for preparing a compound of the formula:

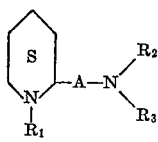

wherein R₁ is a member selected from the class consisting of hydrogen, lower alkyl, benzyl, lower alkoxy benzyl, lower alkanoyl, lower alkoxy benzoyl, nitrobenzoyl, aminobenzoyl, halobenzoyl, lower carbalkoxy, and lower alkanol;

is a group selected from the class consisting of di(lower alkyl) amino, piperidino, and morpholino groups; A is a lower alkylene group containing from one to five carbon atoms, and S indicates that the ring is saturated, which comprises; the step of reducing with hydrogen gas in the presence of a hydrogenation catalyst a compound of the formula

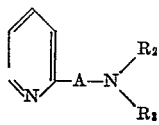

to prepare a compound having the formula

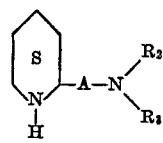

then condensing said last named compound with a halide from the group consisting of lower alkyl, monocyclic homocyclic lower aralkyl, lower alkanoyl, substituted benzoyl, lower carbalkoxy and lower alkanol halides.

8. The process of producing compounds of the formula

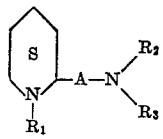

wherein R₁ is a member selected from the class consisting of lower alkyl,

is a group selected from the class consisting of di(lower alkyl) amino, piperidino, and morpholino groups, benzyl, lower alkoxy benzyl, lower carbalkoxy, and lower alkanol; lower alkanoyl, lower alkoxy benzoyl, nitrobenzoyl, aminobenzoyl, halobenzoyl; A is a lower alkylene group containing from one to five carbon atoms, and S indicates that the ring is saturated, which comprises: condensing a compound of the above formula wherein R₁ is hydrogen with a halide of the group consisting of lower alkyl, benzyl, lower alkoxy benzyl, lower alkoxy benzoyl, nitrobenzoyl, aminobenzoyl, halobenzoyl, lower carbalkoxy, and lower alkanols.

References Cited in the file of this patent

FOREIGN PATENTS

| Number | Country | Date |
|---|---|---|
| 409,732 | Great Britain | May 1, 1934 |

OTHER REFERENCES

Clarke: Chem. Abst., vol. 6 (1912), p. 34.
Lukes: Chem. Abst., vol. 42 (1948), p. 5899.
Cerkovnikov: Chem. Abst., vol. 42 (1948), pp. 3394-6.